(12) United States Patent
Hamada et al.

(10) Patent No.: US 7,944,504 B2
(45) Date of Patent: May 17, 2011

(54) APPARATUS FOR INTERPOLATING SCANNING LINES

(75) Inventors: Koichi Hamada, Tokyo (JP); Mitsuo Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 748 days.

(21) Appl. No.: 11/214,857

(22) Filed: Aug. 31, 2005

(65) Prior Publication Data

US 2006/0181642 A1 Aug. 17, 2006

(30) Foreign Application Priority Data

Feb. 15, 2005 (JP) ................. 2005-037061

(51) Int. Cl.
- *H04N 7/01* (2006.01)
- *H04N 11/20* (2006.01)
- *H04N 5/14* (2006.01)
- *H04N 9/64* (2006.01)
- *H04N 3/14* (2006.01)

(52) U.S. Cl. ........ 348/458; 348/441; 348/448; 348/452; 348/699; 348/790

(58) Field of Classification Search .................. 348/441, 348/448, 449, 451, 452, 558, 699
See application file for complete search history.

(56) References Cited

U.S. PATENT DOCUMENTS

| | | | | |
|---|---|---|---|---|
| 5,661,525 A * | 8/1997 | Kovacevic et al. | ............ | 348/452 |
| 5,682,205 A * | 10/1997 | Sezan et al. | .................... | 348/452 |
| 5,844,616 A * | 12/1998 | Collet et al. | .................. | 348/441 |
| 6,122,017 A * | 9/2000 | Taubman | ...................... | 348/620 |
| 6,339,616 B1 * | 1/2002 | Kovalev | .................... | 375/240.16 |
| 6,381,279 B1 * | 4/2002 | Taubman | .................. | 375/240.18 |
| 6,452,639 B1 * | 9/2002 | Wagner et al. | ................ | 348/448 |
| 6,456,340 B1 * | 9/2002 | Margulis | ........................ | 348/745 |
| 6,512,550 B1 * | 1/2003 | de Garrido et al. | ........... | 348/452 |
| 6,606,126 B1 * | 8/2003 | Lim et al. | ...................... | 348/452 |
| 6,639,944 B1 * | 10/2003 | De Haan et al. | ......... | 375/240.17 |
| 6,658,155 B1 * | 12/2003 | Kondo et al. | ................. | 382/238 |
| 6,711,211 B1 * | 3/2004 | Lainema | .................. | 375/240.24 |
| 6,717,622 B2 * | 4/2004 | Lan | ................ | 348/625 |
| 6,788,347 B1 * | 9/2004 | Kim et al. | ..................... | 348/441 |
| 6,831,948 B1 * | 12/2004 | Van Dijk et al. | ......... | 375/240.12 |
| 6,900,846 B2 * | 5/2005 | Lee et al. | ...................... | 348/459 |
| 6,940,557 B2 * | 9/2005 | Handjojo et al. | ............. | 348/452 |
| 6,968,008 B1 * | 11/2005 | Ribas-Corbera et al. | ........................ | 375/240.16 |
| 6,992,725 B2 * | 1/2006 | Mohsenian | ................... | 348/448 |
| 7,042,512 B2 * | 5/2006 | Yang et al. | ..................... | 348/452 |
| 7,075,580 B2 * | 7/2006 | Jiang | ............................. | 348/448 |
| 7,103,226 B1 * | 9/2006 | Frank et al. | .................... | 382/254 |
| 7,110,012 B2 * | 9/2006 | Messing et al. | ............... | 345/698 |

(Continued)

FOREIGN PATENT DOCUMENTS

EP 0 560 577 9/1993

(Continued)

*Primary Examiner* — Brian Yenke

(74) *Attorney, Agent, or Firm* — Antonelli, Terry, Stout & Kraus, LLP.

(57) ABSTRACT

A scanning line interpolating apparatus has a scanning line interpolating unit for converting an inputted interlaced scanning picture to a progressive scanning picture by using motion compensation, a motion vector search device that searches for a motion vector for use in the motion compensation, and a control unit for controlling the precision with which the motion vector is searched for. The control unit is adapted to determine the search precision on the basis of a pixel structure of a display device for displaying the progressive scanning picture.

7 Claims, 6 Drawing Sheets

U.S. PATENT DOCUMENTS

| | | | |
|---|---|---|---|
| 7,176,980 B2* | 2/2007 | Stone et al. | 348/558 |
| 7,277,132 B2* | 10/2007 | Chen et al. | 348/448 |
| 7,375,763 B2* | 5/2008 | Alfonso et al. | 348/448 |
| 7,620,109 B2* | 11/2009 | Srinivasan | 375/240.29 |
| 2001/0021224 A1* | 9/2001 | Larkin et al. | 375/240.16 |
| 2002/0063807 A1* | 5/2002 | Margulis | 348/745 |
| 2002/0162102 A1* | 10/2002 | Ihara | 725/9 |
| 2003/0112873 A1* | 6/2003 | Demos | 375/240.17 |
| 2003/0169931 A1* | 9/2003 | Lainema | 382/236 |
| 2003/0202607 A1* | 10/2003 | Srinivasan | 375/240.29 |
| 2004/0120401 A1* | 6/2004 | Linzer et al. | 375/240.16 |
| 2004/0190620 A1* | 9/2004 | Alfonso et al. | 375/240.16 |
| 2005/0062885 A1* | 3/2005 | Kadono et al. | 348/407.1 |
| 2005/0105110 A1* | 5/2005 | Katsuyama | 358/1.9 |
| 2005/0220353 A1* | 10/2005 | Karczewicz et al. | 382/238 |
| 2005/0237433 A1* | 10/2005 | Van Dijk et al. | 348/702 |
| 2006/0012708 A1* | 1/2006 | Rosmalen | 348/503 |
| 2006/0109910 A1* | 5/2006 | Nagarajan | 375/240.17 |
| 2006/0146187 A1* | 7/2006 | Handjojo et al. | 348/448 |
| 2006/0238649 A1* | 10/2006 | Brown Elliott et al. | 348/441 |
| 2007/0110159 A1* | 5/2007 | Wang et al. | 375/240.16 |
| 2008/0069203 A1* | 3/2008 | Karczewicz et al. | 375/240.01 |
| 2008/0204393 A1* | 8/2008 | Ben-David | 345/98 |

FOREIGN PATENT DOCUMENTS

| | | |
|---|---|---|
| GB | 2 252 466 | 8/1992 |
| GB | 2 277 006 | 10/1994 |
| JP | 6-121289 | 4/1994 |
| JP | 2000-155551 | 6/2000 |

* cited by examiner

APPARATUS FOR INTERPOLATING SCANNING LINES

INCORPORATION BY REFERENCE

The present application claims priority from Japanese application 2005-037061 filed on Feb. 15, 2005, the content of which is hereby incorporated by reference into this application.

BACKGROUND OF THE INVENTION

The present invention relates to conversion circuits for converting interlaced scanning signals to progressive scanning signals, and particularly to a progressive-scan achieving method and apparatus that generate an interpolating signal by the detection of a motion vector.

In order to convert a 2:1-interlaced scanning signal to a progressive scanning signal, it is necessary to alternately interpolate the scanning lines. As one of the interpolation methods, there is a method for progressive-scan achieving conversion of motion-compensation type. As shown in FIG. 2, the scanning lines are interpolated by using the motion vector between frames or fields (see JP-A-6-121289).

The motion vector indicates from where a certain portion of the current picture has moved here of the previous picture, or one frame before the current picture. In the block matching method, the optimum block that is the most similar (namely, of the highest correlation) to the targeted block of the current frame or current field is extracted from the search range of a reference frame or reference field, and the motion vector is detected from the positional relation between the targeted block and the optimum block. Therefore, if a certain object moves in the horizontal direction with a speed of V (number of pixels/field) during a one-field period, the picture one field before is shifted by the estimated amount of movement V, so that a block with the highest correlation between the fields can be obtained (that is, the accumulative addition of the differences between the targeted block and the candidate block of the fields is the smallest).

On the other hand, the display device such as color liquid crystal display (LCD) or plasma display (PDP), as for example shown in FIG. 5, has display picture elements (hereinafter, called pixels) each formed of three RGB light emitting elements (hereinafter, referred to as RGB sub-pixels) arranged in a predetermined order in one direction, or in the horizontal direction (x-direction) as illustrated to form a line and a plurality of those lines further provided in the direction perpendicular to this horizontal line, or in the vertical direction (y-direction). Thus, the display screen is formed to extend in the two-dimensional direction. Use of the three RGB sub-pixels for each pixel makes it possible to display various different colors.

In recent years, this display device has been used to display high-definition characters. A new technology such as sub-pixel font rendering technology has attracted people's attention. This technology handles the RGB sub-pixels as individual monochrome pixels to apparently improve the resolution (for example, see JP-A-2000-155551). The RGB sub-pixels have been treated as one pixel in the conventional depiction, while the recent depiction of characters uses the horizontal sub-pixels to increase the definition in the arrangement direction three times as much (the example shown in FIG. 5 is capable of displaying with three-fold resolution in the horizontal direction). As to the displaying of characters, Microsoft's ClearType has already implemented the so-called sub-pixel depiction.

SUMMARY OF THE INVENTION

The pixel value of each pixel of the display device is formed of the values of RGB sub-pixels. If each of the sub-pixels of R, G and B is expressed by 8-bit gradation, the pixel value of each sub-pixel R, G, B takes a value of 0~255. On the other hand, when the motion vector is searched for, the luminance Y of each pixel is used that is computed from three sub-pixel values R, G and B. If the sub-pixel values are represented by R1, G1 and B1, respectively, the luminance Y is computed from the following equation.

$$Y = k1*R1 + k2*G1 + k3*B1$$

In this equation k1, k2 and k3 are coefficients. In the prior art, a set of R, G and B is considered as one pixel, and the pixels are interpolated by the motion compensation based on the motion vector that is found by the motion search using this luminance. Since the conventional search for motion vector does not consider the pixel structure of the display means, the precision with which the motion vector is searched for is of a less-computation integer pixel or ½ pixel.

If, as for example shown in FIG. 3, the pixel at the position of 111 in a field picture 1 is found to have moved one pixel in the direction of 116 in a field picture 3 from the motion vector search with the precision of integer pixel or ½ pixel, the motion-detected pixel in a field picture 2 is estimated as shifted ½ pixel, and thus ½ the value of pixel 111 is assigned to the pixels 113 and 114.

In other words, if the values of sub-pixels R, G and B of position 111 are represented by R1, G1 and B1 in FIG. 3, the values R1', G1' and B1' of the interpolating pixel 113 in the field picture 2 and the values R2', G2' and B2' of the interpolating pixel 114 in the field picture 2 when the pixel 111 is detected as having moved one pixel in the direction of 112 are given as follows.

$$R1' = R1*(½)$$

$$G1' = G1*(½)$$

$$B1' = B1*(½)$$

$$R2' = R1*(½)$$

$$G2' = G1*(½)$$

$$B2' = B1*(½)$$

Thus, since the scanning line interpolation is carried out for each pixel irrespective of the pixel structure of the display means, correct pixel interpolation is not made in the horizontal direction if a small number of pixels are provided in the horizontal direction of the display means. Consequently, the effect of improving the picture quality by the scanning line interpolation is not achieved enough to remove the picture quality deterioration such as the blurring of vertical edges and appearing of discontinuous slant lines.

The typical invention disclosed in this application is as follows.

A scanning line interpolating apparatus according to the invention has a scanning line interpolating unit that converts an inputted interlaced scanning picture to a progressive scanning picture by using motion compensation, a motion vector search device that searches for a motion vector for use in the motion compensation, and a control unit that controls the precision with which the motion vector is searched for. Particularly the control unit determines the search precision on the basis of the pixel structure of a display unit for displaying the progressive scanning picture. Thus, since the motion compensation is carried out with the motion search precision that is determined by the pixel structure of the display device, the pixel interpolation can be made for each sub-pixel unit.

Thus, the scanning line interpolation can be performed to reduce the picture quality deterioration such as blurring of edges and appearing of disconnected slant lines.

Other objects, features and advantages of the invention will become apparent from the following description of the embodiments of the invention taken in conjunction with the accompanying drawings.

DETAILED DESCRIPTION OF THE EMBODIMENTS

Embodiments of the invention will be described with reference to the accompanying drawings.

Embodiment 1

Figure 1:
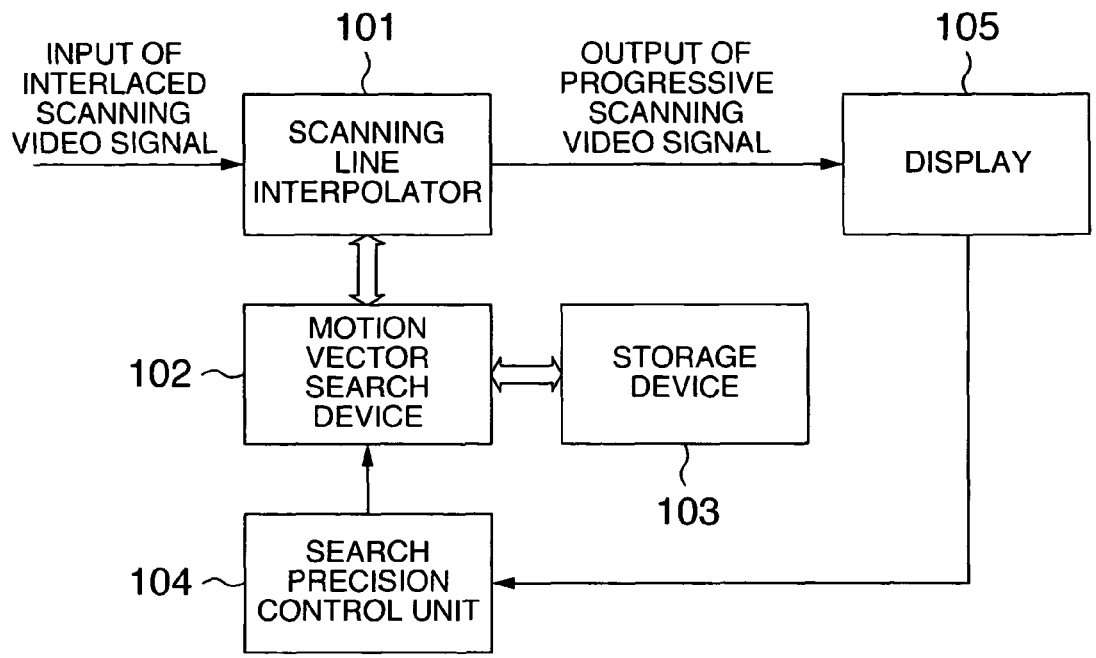
FIG. 1 is a diagram showing an embodiment of a video receiver according to the invention.
Figure 2:
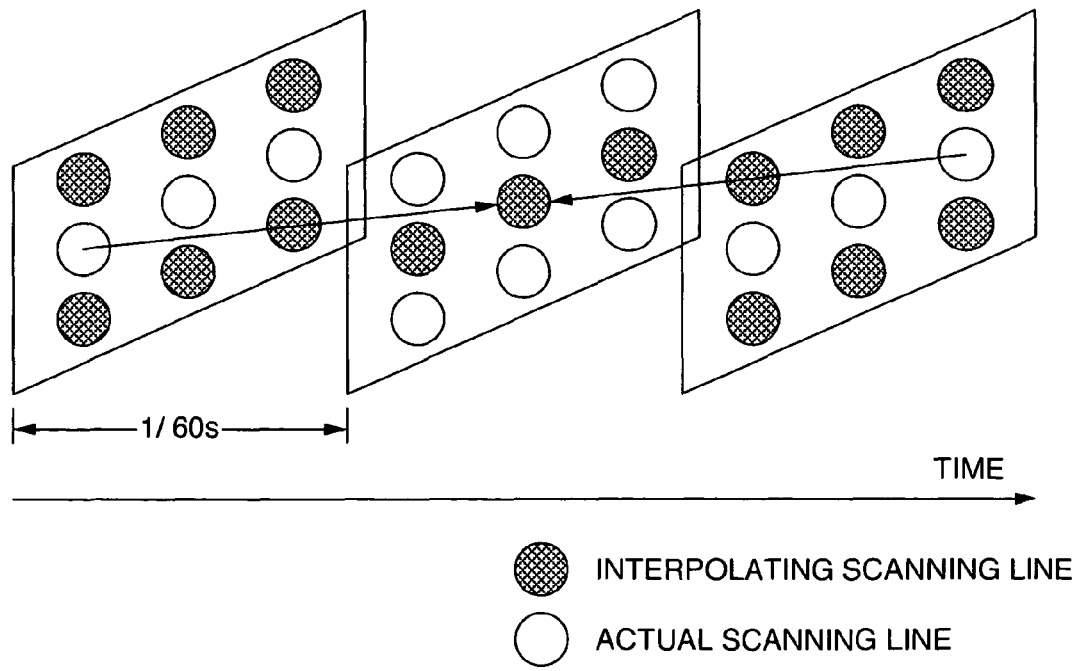
FIG. 2 is a conceptional diagram showing the motion-compensation type conversion to the progressive scanning.
Figure 3:
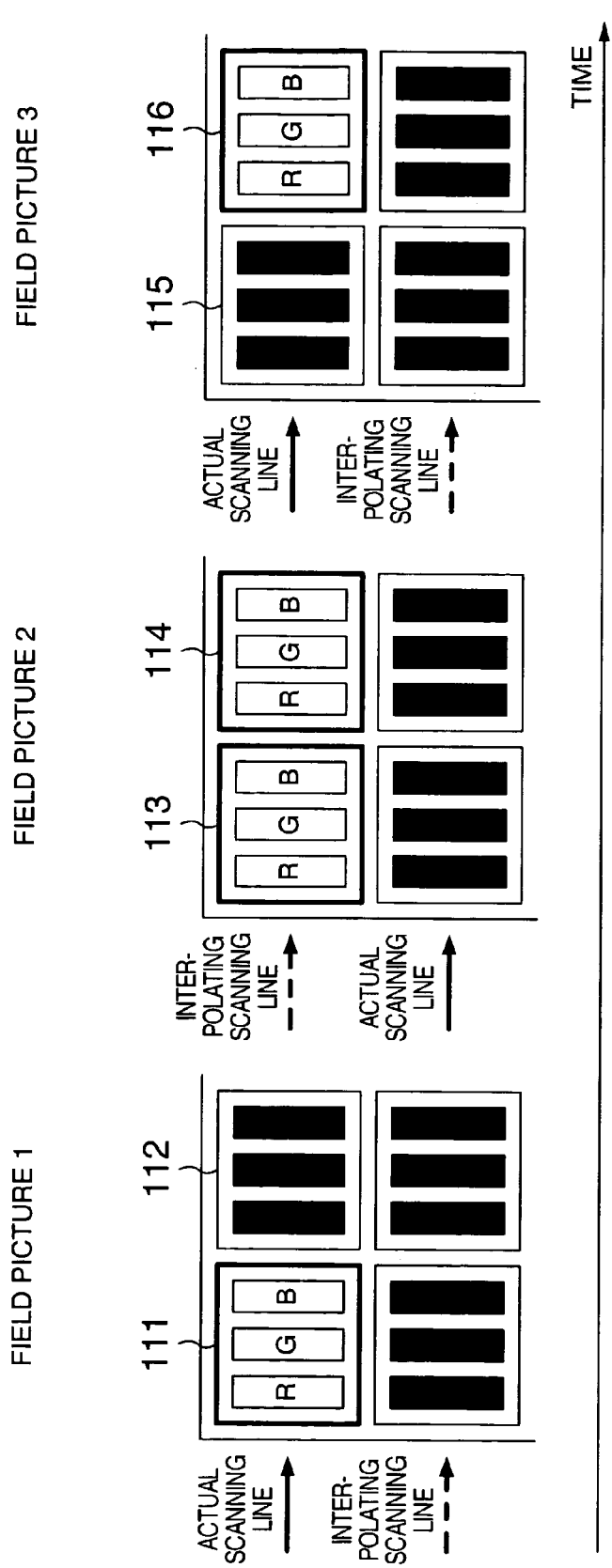
FIG. 3 is a conceptional diagram showing a conventional method for scanning line interpolation.

FIG. 1 shows an example of the construction of a video receiver according to this invention.

A signal to be fed to a scanning line interpolator 101 is an interlaced video signal produced when a television broadcast is received or when a reproducer reproduces a recorded disk such as a video-recorded DVD. The 2:1-interlaced video signal inputted to the interpolator is supplied to a motion vector search device 102, which searches for the motion vector of the video signal. The motion vector indicates how much and from where a certain portion of the current picture to be processed has moved of another picture or the same picture to this position of the current picture. Several different methods are used for detecting this motion vector, but the block matching method is frequently used because digital circuits are used to make the process easy. In the block matching method, a picture is divided into blocks of (M×N) pixels each (for example, 8 pixels×8 lines), and the motion vector is detected for each block unit.

A storage device 103 records a reference frame or reference field necessary to search for the motion vector. Specifically, it stores pixel value information of the frames or fields that occur before and after the current frame or current field on a time basis. A search precision controller 104 refers to the pixel structure of a display device 105 and determines from the pixel structure the precision with which the motion vector search device 102 searches. The display device 105 displays the progressive scanning video signal produced from the scanning line interpolator.

Figure 6:
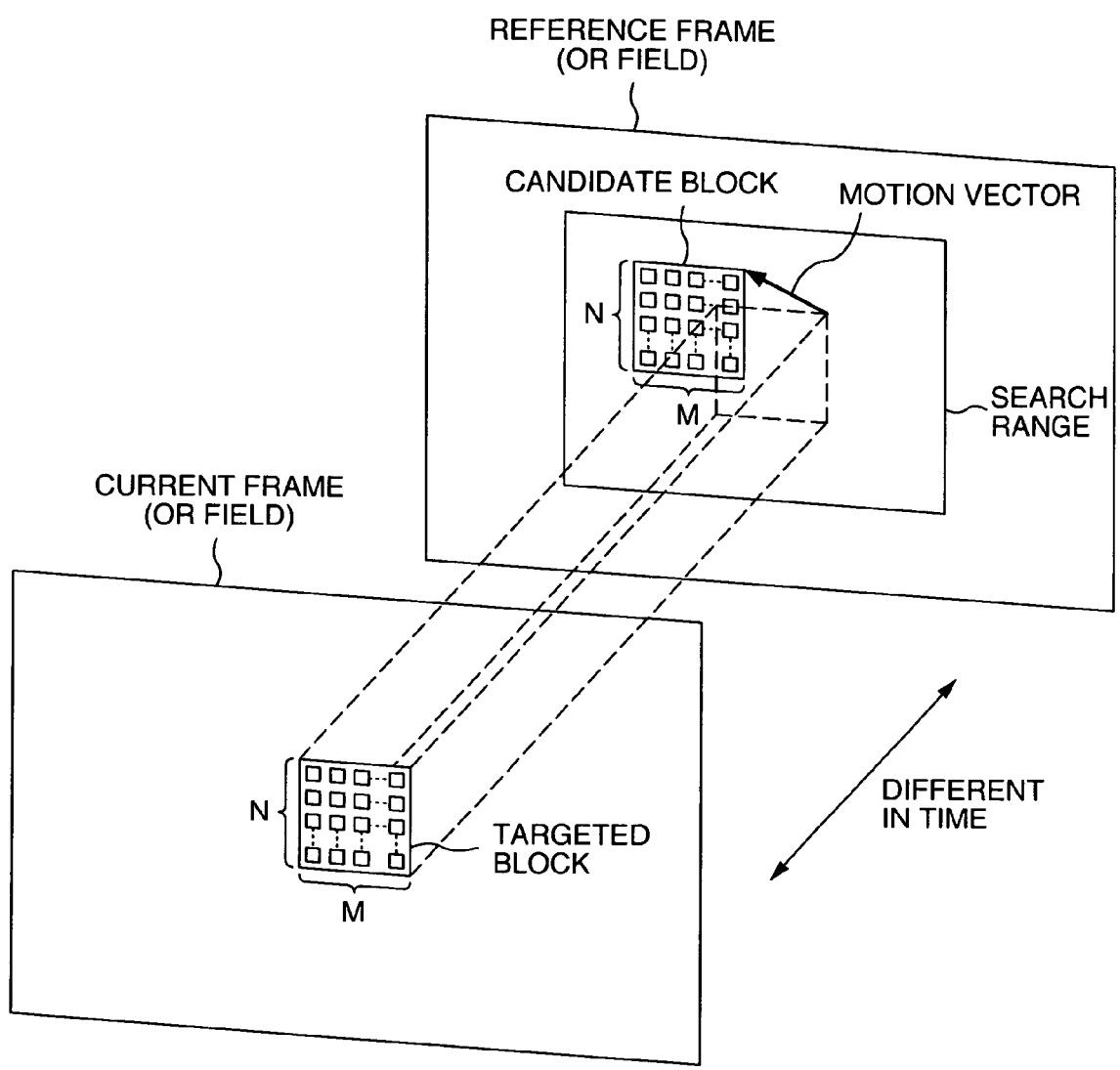
FIG. 6 is a diagram showing an example of a method for detecting the motion vector.

The block matching method evaluates the correlation of a candidate block to a targeted block of (M×N) pixels included within the current frame or current field as shown in FIG. 6. The candidate block is formed of (M×N) pixels and set on the reference frame or reference field that is different in time from the current frame or current field. The evaluation value of the correlation is, for example, the value with which the similarity between the targeted block and the candidate block can be evaluated. Specifically, the evaluation value is found by accumulatively adding the absolute values of the differences between the pixel values at the same positions. The candidate block of which the estimation value of the correlation is the smallest is compared to the targeted block projected on the reference frame or reference field, and the displacement of the candidate block to the targeted block is detected as the motion vector.

The precision with which this motion vector is searched for is one-pixel precision or ½ pixel precision in the MPEG compression. This invention is characterized in that the precision with which the motion vector is searched for is changed according to the pixel structure of the display device 105. The search precision controller 104 acquires the pixel structure information of the display device 105, and uses the pixel structure to control the precision with which the motion vector search device 102 searches for the motion vector.

Figure 5:
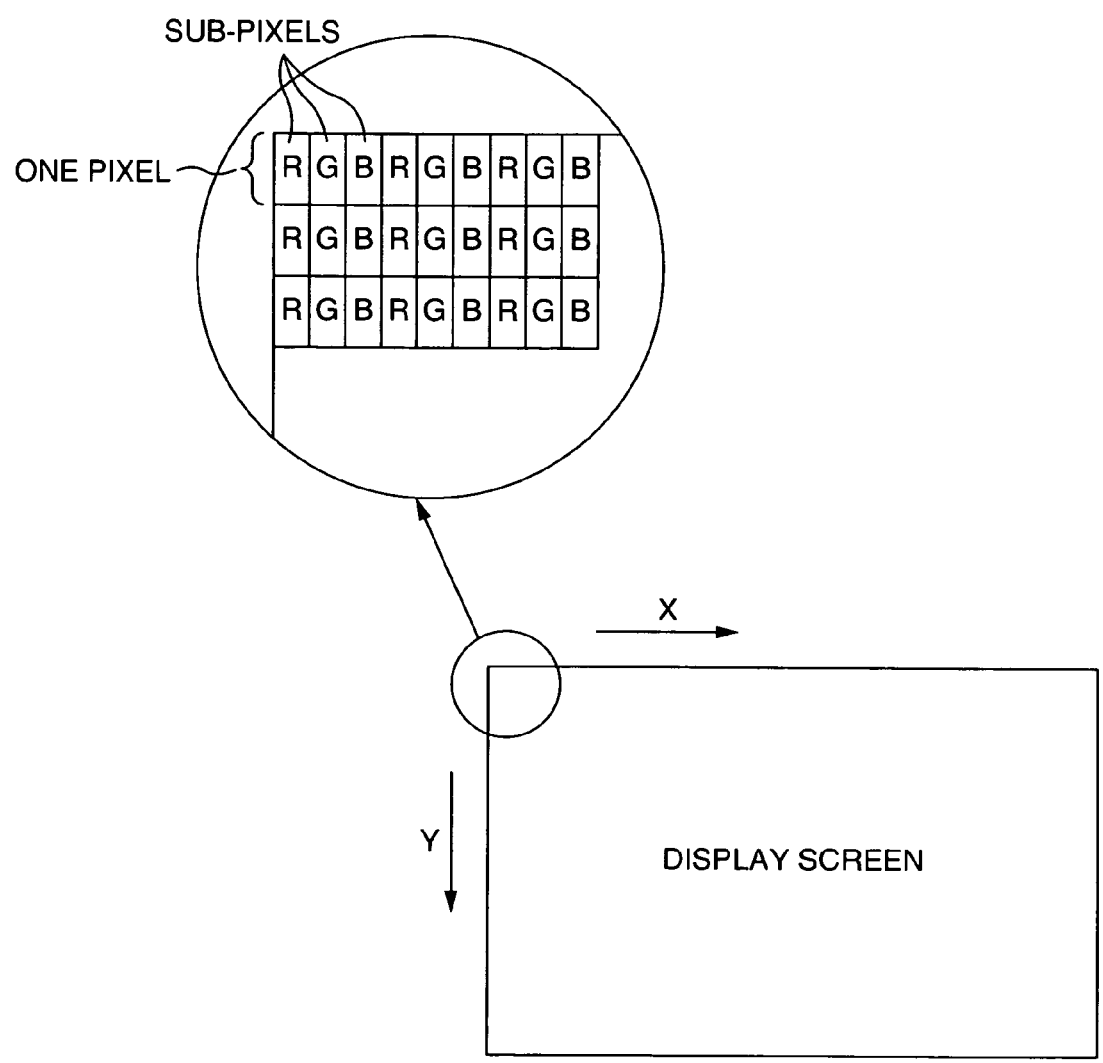
FIG. 5 is a partially magnified conceptional diagram showing an example of the arrangement of sub-pixels and pixels.

If the display device 105 has the structure of the vertical stripes of which each pixel is formed of three kinds of sub-pixels R, G and B as shown in FIG. 5, the horizontal precision with which the motion vector is searched for is selected to be ⅓ pixel. In other words, the motion is searched for with the precision corresponding to the division of the distance between the pixels by the number of sub-pixels that form each pixel of the display screen. However, the application of the invention is not limited to the display having the RGB vertical stripes. Since the motion is searched for with the sub-pixels RGB considered as independent pixels, the invention can be similarly applied to, for example, the display having the RGB horizontal stripes because the vertical precision with which the motion vector is searched for is selected to be ⅓ pixel. In addition, if each pixel of a display has two or more kinds of sub-pixels as the pixel structure, this invention can be applied to this display.

The motion is searched for according to the brightness information of the pixels. The search for the motion vector with ⅓ pixel precision is performed by triply interpolating the current frame or field and the reference frame or field in the horizontal/vertical direction. This interpolation process and the motion search process are based on the same concept as that of the search for the motion vector with ½ pixel precision used in MPEG. The correlation between the blocks that is estimated when the motion is searched for can be found by using the RGB brightness values of the pixels that exist at the corresponding positions as described above. In addition, only the pixel values of a particular color (for example, the pixel values of G) may be used for the motion vector to be searched for.

Figure 4:
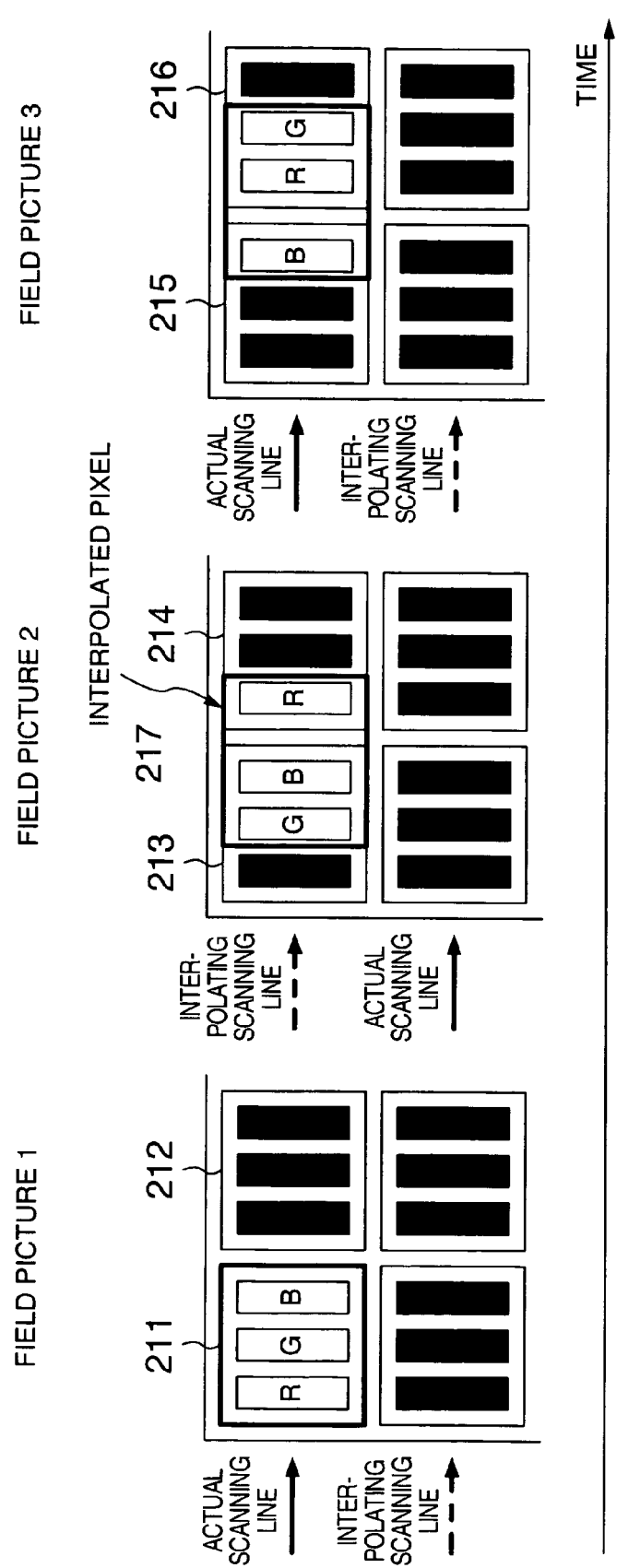
FIG. 4 is a conceptional diagram showing the sub-pixel scanning line interpolation.

We now assume that, by the search for the motion vector, the pixels at the position of 211 of a field picture 1 as pixels to be interpolated in a scanning line was found moved ⅔ pixel in the direction of 216 of a field picture 3 as, for example, shown in FIG. 4. In this case, since the pixels of 211 can be considered to have moved ⅓ pixel in the direction of 214 in a field picture 2, interpolation of pixels is made by shifting the pixels of 211 to the position of 217 as illustrated.

Thus, since the motion compensation is thus performed with the horizontal search precision selected as ⅓ pixel according to the pixel structure of the display device, the pixel interpolation can be made with the precision of ⅓ pixel in the horizontal direction. Therefore, the interpolation of the scanning lines can be made with the reduction of the picture quality deterioration such as blurring of vertical edges and appearing of discontinuous slant lines. If the conventional method is used as mentioned above, the motion of less than one pixel is expressed by using the two adjacent pixels. Therefore, when interpolation was made for the scanning lines of, for example, a picture including a slant line with one-pixel width in the horizontal direction, the slant line on the actual scanning line side had the width of one horizontal pixel, whereas the slant line on the interpolated side had the width of two blurred horizontal pixels. According to this invention, interpolation can be made with the precision of ⅓ pixel matched to the sub-pixel structure of the display screen, and even on the interpolated side the lines can be interpolated with the width of one horizontal pixel.

Since the display device has the pixels of R, G and B independently supplied with a video signal, there is no need to use any special processes or circuits on the display device side when the sub-pixel process in the invention is used that regards the pixels of R, G and B as independent. In the video signal output side (the converter for converting to the progressive scanning in this invention), the signal for controlling the sub-pixels is necessary to produce in consideration with the value of each sub-pixel interpolated according to the pixel structure of this invention.

Figure 8:
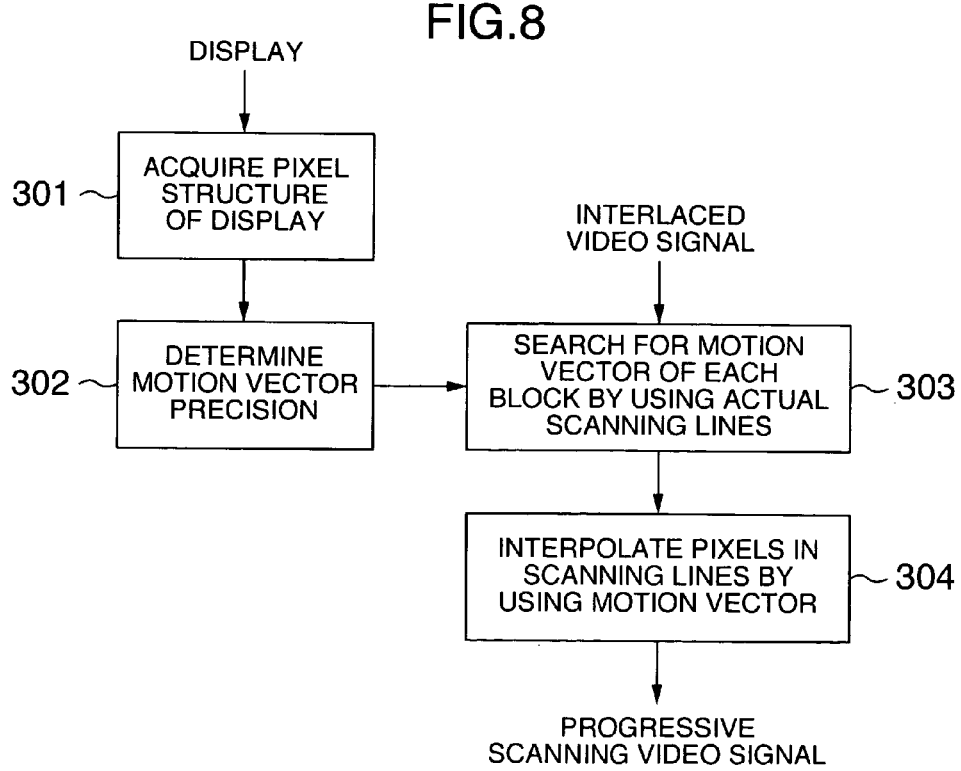
FIG. 8 is a flowchart showing an example of the operation of the converter for converting to the progressive scanning.

FIG. 8 is a flowchart showing the operation of the converter for converting to the progressing scanning according to the invention. First, a signal indicative of the pixel structure of the display device is acquired (301). In this case, the information from the display device may be received or the previously stored information may be read out. Then, the precision with which the motion vector is searched for is determined according to the acquired pixel structure information (302). The motion vector in the interlaced signal to the converter is searched for with the determined motion search precision by using the existing scanning lines (303). The pixels of lines to be interpolated are inserted according to the searched motion vector, and the resulting progressive scanning video signal is produced (304). This interpolation method sometimes causes some sub-pixels not to be interpolated. For such sub-pixels, the values of the sub-pixels near the interpolated regions are used to interpolate.

While an example of the motion vector search using the block matching is shown in this embodiment, this invention is not limited to the motion vector search using the block matching, but may be applied to the motion vector search for each pixel.

Embodiment 2

Figure 7:
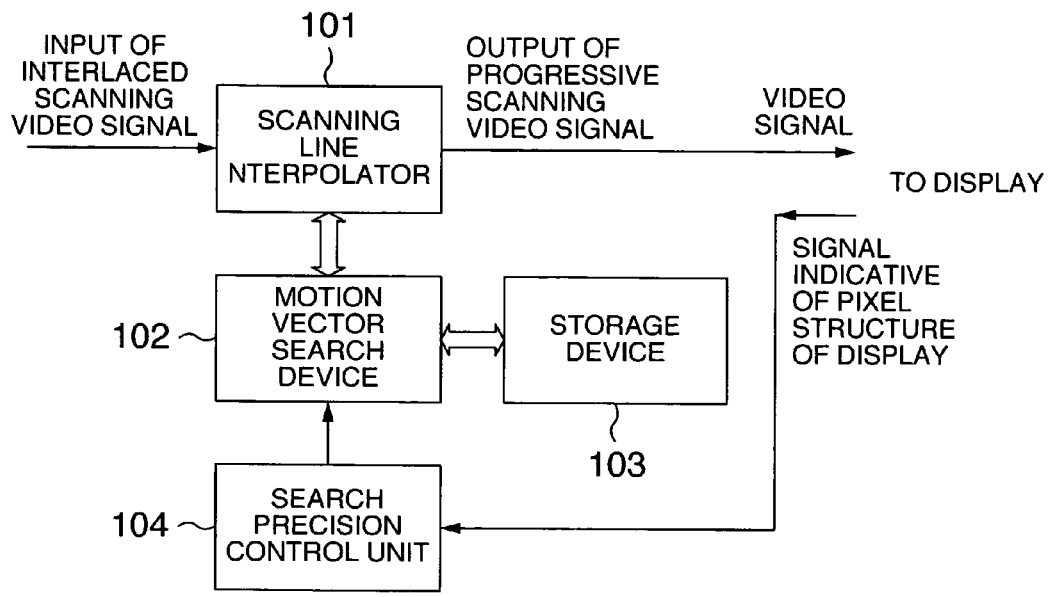
FIG. 7 is a diagram showing an embodiment of the converter for converting to the progressive scanning.

While the video receiver includes the display device in the embodiment 1, this invention is relevant to the converter for converting to the progressive scanning, and thus the display device and the other constituent elements may be provided outside the converter as shown in FIG. 7. In this case, the search precision controller 104 can operate to receive the information of pixel structure sent from the display device that is externally connected to the converter, and to switch the search precisions as needed. Of course, the display devices and their pixel structures may be previously stored in the storage device in association with each other, so that the precision can be determined according to the model number or the like acquired from the display device.

Thus, when the pixel structure information and model number information can be obtained from the display device, the precisions with which the motion vector is searched for can be automatically switched, and thus the conversion to the progressive scanning can be suitably carried out for the display device. In addition, when the converter for converting to the progressive scanning and the display device are connected within a unitary body, the pixel structure of the display device is known. Therefore, the precision that the search precision controller 104 is to determine can be previously selected to be a fixed value that is initially set.

Embodiment 3

A switch can also be provided so that the precision with which the motion vector is searched for can be fixed to a predetermined precision (for example, the precision of one pixel) when the pixel structure of the display device is unknown or when the pixel structure information cannot be obtained. In addition, in order to make it possible to select the conventional interpolation method that converts to the progressive scanning without searching for the motion vector, a switch may be provided within the motion vector search device so that the input command from the search device to the scanning line interpolator can be selected. In this case, the conversion between the scanning systems is performed by a conversion method separately provided in the scanning line interpolator.

By providing the switch for selecting the precisions with which the motion vector is searched for or the switch for selecting the methods for the conversion to the progressive scanning, and by the user's ordering it to operate or making it automatically operate, it is possible to properly convert to the progressive scanning even if the pixel structure of the display device is unknown or if the pixel structure information cannot be obtained.

The flow according to the invention of this application can be achieved by reading a program into a computer. In addition, the coordinated process using both software and hardware may be executed to achieve the flow.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A scanning line interpolating apparatus comprising:

a scanning line interpolating unit arranged to convert an inputted interlaced scanning picture to a progressive scanning picture by creating interpolating pixels by motion compensation based on a motion vector;

a motion vector search device arranged to search for a motion vector for use in said motion compensation; and a control unit arranged to determine a searching precision of said motion vector based on a sub-pixel structure of a display device;

wherein said interpolating pixels are created by being shifted in sub-pixel basis in accordance with a result of a search of said motion vector.

2. An apparatus according to claim 1, wherein said pixel structure includes a number of sub-pixels that constitute each pixel, and said control unit determines a reciprocal of said number of sub-pixels as said motion vector searching precision.

3. An apparatus according to claim 1, wherein information of said pixel structure of said display device is received from said display device connected to said apparatus.

4. An apparatus according to claim 1, wherein when said pixel structure has three sub-pixels, R, G, and B, per pixel in a horizontal direction, said motion vector searching precision in the horizontal direction is determined as ⅓ pixel precision.

5. An apparatus according to claim 1, further comprising a switch unit arranged to switch between a plurality of values of said motion vector searching precision.

6. An apparatus according to claim 1, wherein block matching is used for searching for said motion vector.

7. An apparatus according to claim 1,
wherein when the pixel structure of the display device is a structure of vertical stripes formed by n kinds of sub-pixels, said motion vector searching device performs the search of the motion vector by 1/n pixel precision in a horizontal direction and 1 pixel precision in a vertical direction; and
wherein when the pixel structure of the display device is a structure of horizontal stripes formed by n kinds of sub-pixels, said motion vector searching device performs the search of the motion vector by 1/n pixel precision in a vertical direction and 1 pixel precision in a horizontal direction.

* * * * *